US010327149B2

(12) United States Patent
Chen

(10) Patent No.: US 10,327,149 B2
(45) Date of Patent: Jun. 18, 2019

(54) MANAGING LICENSED AND UNLICENSED COMMUNICATIONS USING CELLULAR PROTOCOLS

(71) Applicant: General Motors LLC, Detroit, MI (US)

(72) Inventor: Bonnie Chen, Grapevine, TX (US)

(73) Assignee: General Motors LLC, Detroit, MI (US)

( * ) Notice: Subject to any disclaimer, the term of this patent is extended or adjusted under 35 U.S.C. 154(b) by 105 days.

(21) Appl. No.: 15/145,538

(22) Filed: May 3, 2016

(65) Prior Publication Data

US 2017/0325097 A1 Nov. 9, 2017

(51) Int. Cl.

| H04W 16/14 | (2009.01) |
|---|---|
| H04L 29/08 | (2006.01) |
| H04W 48/18 | (2009.01) |
| H04W 76/10 | (2018.01) |
| H04W 84/04 | (2009.01) |
| H04W 84/12 | (2009.01) |

(52) U.S. Cl.
CPC ............ H04W 16/14 (2013.01); H04L 67/12 (2013.01); H04L 67/327 (2013.01); H04W 48/18 (2013.01); H04W 76/10 (2018.02); H04W 84/042 (2013.01); H04W 84/12 (2013.01)

(58) Field of Classification Search
CPC ..... H04W 48/18; H04W 16/06; H04W 16/10; H04W 28/085; H04W 28/16; H04W 36/06; H04B 1/0064; H04B 1/3822
See application file for complete search history.

(56) References Cited

U.S. PATENT DOCUMENTS

| 9,313,607 | B2 * | 4/2016 | Dimou | H04W 4/005 |
|---|---|---|---|---|
| 9,462,478 | B2 * | 10/2016 | Mueck | H04W 16/14 |
| 9,607,449 | B1 * | 3/2017 | Chen | G07C 5/008 |
| 9,668,285 | B2 * | 5/2017 | Zhang | H04W 48/12 |
| 9,801,224 | B2 * | 10/2017 | Taori | H04W 74/0808 |
| 2009/0280748 | A1 * | 11/2009 | Shan | H04W 52/367 455/67.11 |
| 2011/0151924 | A1 * | 6/2011 | Miller | H04W 48/18 455/552.1 |
| 2014/0206322 | A1 * | 7/2014 | Dimou | H04W 4/005 455/414.1 |

(Continued)

FOREIGN PATENT DOCUMENTS

WO WO-2015187276 A1 * 12/2015 ............ H04W 36/22

*Primary Examiner* — Matthew C Sams
(74) *Attorney, Agent, or Firm* — Reising Ethington P.C.; David Willoughby

(57) ABSTRACT

A system and method of identifying licensed and unlicensed communications over a cellular protocol includes: wirelessly transmitting a communication session request from a wireless device to a wireless carrier system using the LTE cellular protocol; receiving a response at the wireless device from the wireless carrier system indicating that the wireless carrier system is providing a communication session using a licensed communications frequency band or an unlicensed communications frequency band; and establishing communications from the wireless device via the wireless carrier system based on whether the wireless carrier system is providing cellular communications via the licensed communications frequency band or the unlicensed communications frequency band.

13 Claims, 2 Drawing Sheets

(56) References Cited

U.S. PATENT DOCUMENTS

| | | | |
|---|---|---|---|
| 2014/0376483 A1* | 12/2014 | Hong | H04W 72/048 370/329 |
| 2015/0237548 A1* | 8/2015 | Luo | H04W 36/06 370/329 |
| 2015/0256303 A1* | 9/2015 | Belghoul | H04L 5/001 370/329 |
| 2016/0105915 A1* | 4/2016 | Zhang | H04W 48/12 370/329 |
| 2016/0142192 A1* | 5/2016 | Damnjanovic | H04W 74/0816 370/329 |
| 2016/0150587 A1* | 5/2016 | Taori | H04W 74/0808 370/329 |
| 2016/0227578 A1* | 8/2016 | Lee | H04W 74/004 |
| 2016/0261291 A1* | 9/2016 | Colella | H04B 1/0064 |
| 2016/0294707 A1* | 10/2016 | Chen | H04L 47/24 |
| 2017/0238230 A1* | 8/2017 | Chen | H04W 36/36 455/437 |
| 2017/0257842 A1* | 9/2017 | Hessler | H04W 68/005 |

\* cited by examiner

MANAGING LICENSED AND UNLICENSED COMMUNICATIONS USING CELLULAR PROTOCOLS

TECHNICAL FIELD

The present invention relates to wireless devices and, more particularly, to wireless devices communicating using a cellular communications protocol.

BACKGROUND

A progression of cellular communications protocols have been created to improve cellular communications performance. These protocols and architecture have been developed by the $3^{rd}$ Generation Partnership Project (3GPP), which comprises a group of telecommunications associations that collectively develop the rules and standards used to implement cellular communications protocols. For example, the 3GPP has created a progression of cellular communications standards or protocols including a 2G cellular communications protocol, such as EDGE, a 3G cellular communications protocol including UMTS, and 4G Long Term Evolution (LTE) cellular communications protocols.

The evolving cellular communications protocols are aimed at improving cellular communications performance. For example, the evolution of cellular communications protocols has progressively increased data transmission speeds. 3G UMTS cellular protocols support download speeds ranging from 7-14 Mbits/s while 4G LTE supports download rates as high as 300 Mbits/s. An increasing number of users communicating via wireless carrier systems using cellular communications protocols as well as the data-rich content of high-definition video has spurred the creation of cellular protocols supporting ever higher data transmission rates. Traditionally, the cellular communications protocols have been carried out over licensed frequency bands privately-controlled by one or more wireless carrier systems. However, cellular communication protocols are evolving in a way that they can be carried out in other ways.

SUMMARY

According to an embodiment of the invention, there is provided a method of managing licensed and unlicensed communications over a cellular protocol. The method includes wirelessly transmitting a communication session request from a wireless device to a wireless carrier system using the cellular protocol; receiving a response at the wireless device from the wireless carrier system indicating that the wireless carrier system is providing a communication session using a licensed communications frequency band or an unlicensed communications frequency band; and establishing communications from the wireless device via the wireless carrier system based on whether the wireless carrier system is providing cellular communications via the licensed communications frequency band or the unlicensed communications frequency band.

According to another embodiment of the invention, there is provided a method of managing licensed and unlicensed communications over a cellular protocol. The method includes wirelessly transmitting a communication session request from a wireless device to a wireless carrier system using the cellular protocol; receiving a response at the wireless device from the wireless carrier system indicating that the wireless carrier system is providing a communication session using a licensed communications frequency band or an unlicensed communications frequency band; determining from the response whether the wireless carrier system is providing cellular communications via the licensed communications frequency band or the unlicensed communications frequency band; identifying the a node the wireless device contacted via the communication session; establishing communications via the wireless carrier system when the wireless device contacted a first node; and ending communications via the wireless carrier system when the wireless device contacted a second node.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
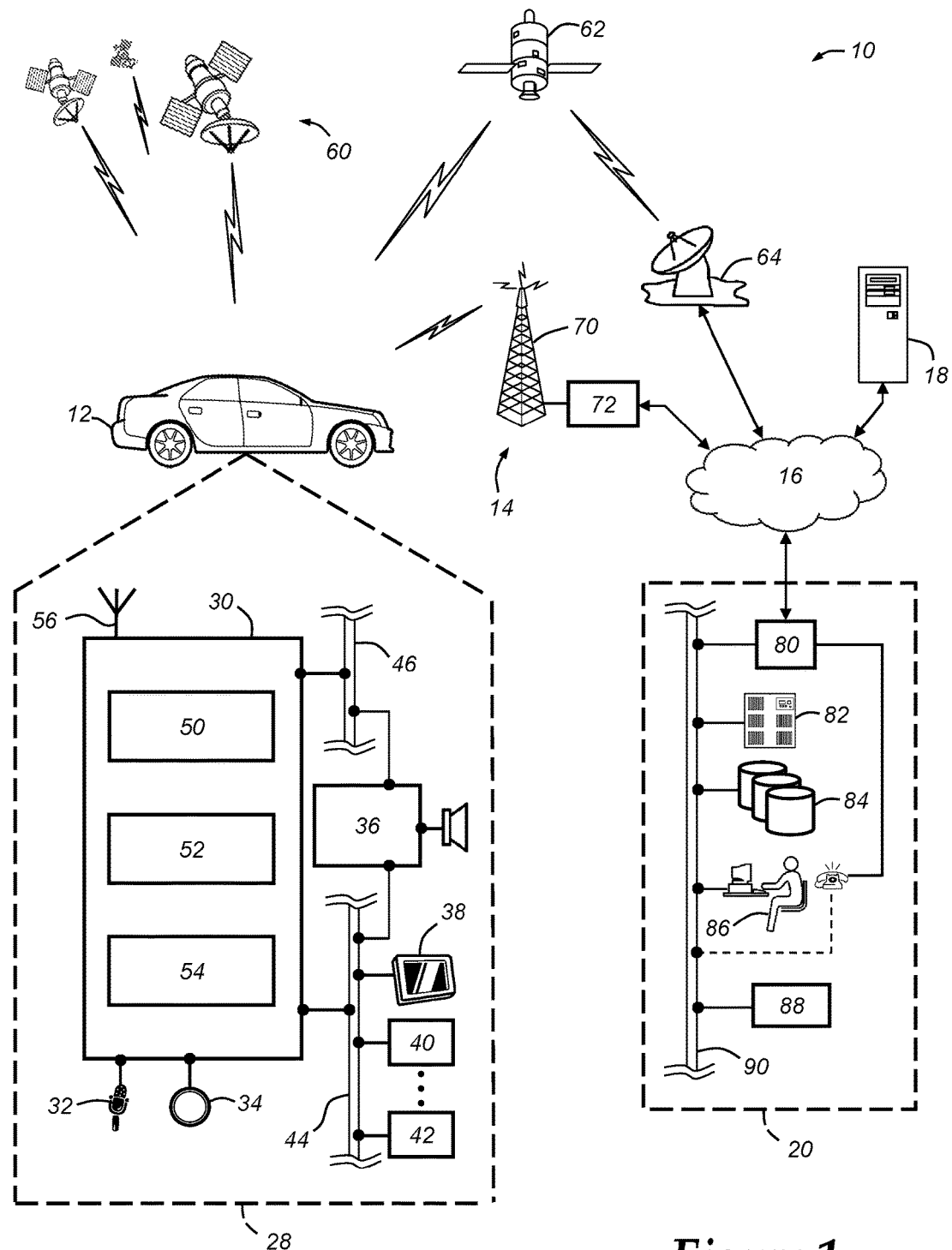
FIG. 1 is a block diagram depicting an embodiment of a communications system that is capable of utilizing the method disclosed herein.

The system and method determines whether cellular communications are carried out over a licensed communications frequency band or an unlicensed communications frequency band using a cellular protocol via a wireless carrier system. Depending on this determination, the wireless device decides whether to end communications via the wireless carrier system using the cellular protocol or continue those communications. The following disclosure will be described in terms of 4G LTE, but it should be appreciated that other cellular protocols or standards could be substituted with success.

The wireless device may determine it is acceptable to continue communicating via the wireless carrier system using a 4G LTE protocol despite doing so over an unlicensed communications frequency band based on the content or destination of those communications. The wireless device can also end its attempt at establishing cellular communications using the 4G LTE cellular protocol when an unlicensed frequency band is used. The wireless device can then continue to reattempt 4G LTE cellular communications with the wireless carrier system until it provides a licensed communications frequency band. Or the wireless device may determine that cellular communications are provided via the wireless carrier system using 4G LTE over a licensed communications frequency band but that based on the content of the communications, an unlicensed communications frequency would suffice. The wireless device can then detach from the wireless carrier system and continue to reattach until the wireless device establishes communications using the unlicensed frequency band.

In the past, the 4G LTE cellular communications protocol specified carrying out communications over licensed communications frequency bands. These licensed communications frequency bands can generally refer to frequency spectrums that have been purchased at a frequency auction by or given to one or more business entities that then control the use of the particular frequency band for wirelessly communicating data. More specifically, wireless broadband communications sent over a licensed frequency band can be controlled and taxed by the business entities, usually wireless carrier systems, providing wireless communications. As wireless devices in the form of User Equipment (UE) communicate voice and data information over a licensed communications frequency band, the wireless carrier system can charge an account associated with the wireless device for its use.

Recently, the 3GPP has modified the 4G LTE cellular communications protocol so that 4G LTE cellular communications may be carried out over unlicensed communications frequency bands as well as licensed communications frequency bands. Unlicensed communications frequency bands include frequencies that have not been sold at a frequency auction and are specified for general communication. Examples of unlicensed communications frequency bands include those used by devices communicating in compliance with the standards set forth in IEEE 802.11. In one example, the 3GPP in release 13 has incorporated use of 4G LTE over unlicensed communications frequency bands as part of LTE WLAN Aggregation (LWA) and Licensed Assisted Access (LAA). LWA can carry out 4G LTE cellular communications using both cellular channels as well as IEEE 802.11 radio links. The LWA does not change the core network and can be integrated into the Enhanced Universal Terrestrial Radio Access Network (E-UTRAN). LAA also uses unlicensed communications frequency bands to augment the licensed frequency bands and can be configured as the secondary access technology in an LTE carrier aggregation system. Other combinations of cellular standards including both licensed and unlicensed frequency bands are possible.

As the wireless device generates a communications session request that is sent to the wireless carrier system as part of establishing a cellular channel via 4G LTE, the wireless device can specify a primary access technology to be a licensed communications frequency band and a secondary access technology as an unlicensed communications frequency band or vice versa. When the wireless carrier system responds by establishing a cellular channel through which the wireless device communicates using 4G LTE, the wireless carrier system can include a flag or data message with the response that indicates whether the channel assigned is in a licensed or unlicensed communications frequency band.

The wireless device can receive this flag/message and determine whether or not further communications using the assigned cellular channel should continue. Generally speaking, communications over the unlicensed communications frequency bands can be less secure and reliable than those carried out over the licensed communications frequency bands. But they are also less expensive than communications carried out over licensed frequency bands. Under some circumstances, communications over the unlicensed communications frequency bands may be preferred due to the reduced cost. These communications could be preferred when the content of the data is less sensitive and a high quality of service (QoS) may not be essential. For example, when a wireless device in the form of a vehicle telematics unit streams video content for vehicle occupants, the delivery of this content may not be essential. So the reduced cost associated with 4G LTE communications over the unlicensed communications frequency band may be preferred. In contrast, if the vehicle telematics unit contacts a call center or Public Safety Access Point (PSAP), the vehicle telematics unit may reject a cellular channel within an unlicensed communications frequency band because a heightened level of QoS and security offered over communications carried out within the licensed communications frequency band may be preferred despite the increased cost. Also, by knowing when communications over the unlicensed communications frequency band exist, the wireless device can more accurately monitor and control communications subject to fees (over licensed communications frequency bands) and those that are not subject to fees (over unlicensed frequency bands).

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of other vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is itself a vehicle system module (VSM) and can be implemented as an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, UMTS, CDMA, 4G LTE, or 5G standards and beyond. It includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as 4G LTE, UMTS, EVDO, CDMA, GPRS, and EDGE.

The 4G LTE cellular standard or protocol is defined by the 3GPP in a collection of continuous publications as will be appreciated by those skilled in the art. The 3GPP has also described 4G LTE as it incorporates LTE WLAN Aggregation (LWA) and Licensed Assisted Access (LAA) in releases 13 and 14. In some implementations, the unlicensed communications frequency band is defined by the frequencies available for WLAN communications in the frequency spectrum.

Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols, WiMAX, ZigBee™, Wi-Fi direct, Bluetooth™, or near field communication (NFC). When used for packet-switched data communication such as TCP/IP, the telematics unit can be configured with a static IP address or can be set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other map-based navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the telematics unit 30, audio system 36, and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbutton(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16 or the Internet. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as 4G LTE. The wireless carrier system 14 can include a Policy Change Rule Function (PCRF), an Online Charging System (OCS), or both that can identify communications carried out using licensed communications frequency bands and then charges accounts associated with the vehicle telematics unit 30 based on that usage. As will be appreciated by those skilled in the art, various cell tower/base station/MSC arrangements are possible and could be used with wireless system 14. For instance, the base station and cell tower could be co-located at the same site or they could be remotely located from one another, each base station could be mounted on a single cell tower or a single cell tower could service various base stations, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, UMTS, LTE and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
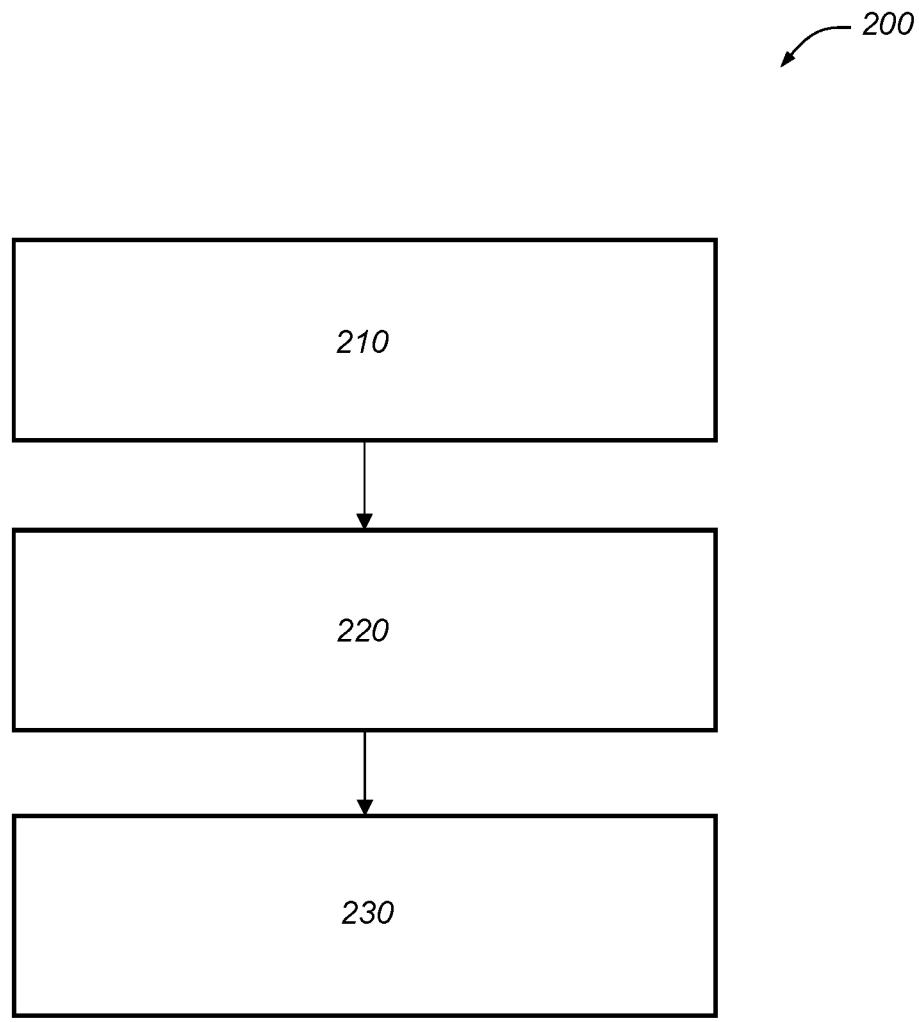
FIG. 2 is a flow chart depicting an embodiment of a method of identifying licensed and unlicensed communications over a Long-Term Evolution (LTE) cellular protocol.

Turning now to FIG. 2, there is shown a method (200) of identifying licensed and unlicensed communications over a cellular protocol. The method 200 begins at step 210 by wirelessly transmitting a communication session request from a wireless device to the wireless carrier system 14 using the cellular protocol. The vehicle telematics unit 30 can initiate a cellular call with the cell tower 70 of the wireless carrier system 14 using the communication session request. As part of initiation, the vehicle telematics unit 30 can begin an attach procedure in accordance with the cellular protocol via a cellular channel within an uplink frequency band available on a licensed communications frequency band. The actual values of the cellular channel and frequency band can vary depending on the business entity that owns the wireless carrier. In one example, 4G LTE provided by Verizon Wireless could be a licensed communications frequency band that lies within the 700, 1700, or 2100 MHz frequency spectrums. More particularly, 4G LTE service offered by Verizon may offer an uplink frequency band between 1850-1910 MHz and a downlink frequency band between 1930-1990 MHz. Cellular channels can be defined by a channel bandwidth that divides the frequency band. Both the uplink and downlink frequency bands described above can be considered licensed communications frequency bands, however many others exist. The attachment procedure can include a message that asks the wireless carrier system 14 to generate and provide a flag indicating that an unlicensed communications frequency band is used to communicate via a cellular protocol.

In addition to the licensed communications frequency bands, unlicensed frequency bands can also be used to communicate via a cellular protocol. As discussed above, techniques including LWA and LAA can be used to carry this out over the frequency bands used for IEEE 802.11 specified communications. The unlicensed frequencies described with respect to method 200 may include the 5 MHz band of IEEE 802.11(ac) having channel bandwidth of 80 or 160 MHz.

After receiving the message, the wireless carrier system 14 can determine whether the cell tower 70 the vehicle telematics unit 30 has attached to is using an unlicensed communications frequency band to carry out cellular communications with the vehicle telematics unit 30. The wireless carrier system 14 can determine whether the PCRF or the OCS is charging an account associated with the vehicle telematics unit 30 and, if so, generate a flag indicating that a licensed communications frequency band is used. The flag could be a logical bit readable by the processor 52 of the vehicle telematics unit 30. The wireless carrier system 14 can wirelessly communicate this flag or message through its cell tower 70 to the vehicle telematics unit 30. It is also possible for the wireless carrier system 14 to monitor attachment behavior by the vehicle telematics unit 30 and store an indication for the unit 30 that represents whether a licensed or unlicensed communications frequency band is preferred. The method 200 is described with regard to a wireless device implemented as the vehicle telematics unit 30 and 4G LTE as the cellular protocol. However, other cellular protocols are possible as well as other wireless devices configured to implement cellular wireless communications techniques. The method 200 proceeds to step 220.

At step 220, a response is received at the vehicle telematics unit 30 from the wireless carrier system 14 indicating that the wireless carrier system 14 is providing a communication session using a licensed communications frequency band or an unlicensed communications frequency band. The communication session can refer to wireless communications between the vehicle telematics unit 30 and the cell tower 70 using a cellular protocol. Once the vehicle telematics unit 30 receives the message indicating whether or not a licensed communications frequency band is used to communicate, the processor 52 can read the message to identify its contents and determine whether a licensed communications frequency band or an unlicensed communications frequency band is being used by the vehicle telematics unit 30 to communicate with the cell tower 70.

In other embodiments, the vehicle telematics unit 30 can determine whether an unlicensed communications frequency band or a licensed communications frequency band is being used by monitoring the frequency at which the cellular chipset sends communication to and receives communications from the cell tower 70. This determination can be performed without receiving a message from the wireless carrier system 14. If the vehicle telematics unit 30 communicates using a frequency band reserved for licensed use, such as the 1900 MHz discussed above, the vehicle telematics unit 30 can determine that it is using a licensed communications frequency band. And if the vehicle telematics unit 30 communicates using a frequency band that is not reserved for licensed use, such at the 5 MHz band discussed above, the unit 30 can determine that it is communicating via an unlicensed communications frequency band. The method 200 proceeds to step 230.

At step 230, communications are established from the vehicle telematics unit 30 via the wireless carrier system 14 based on whether the cell tower 70 is providing cellular communications via the licensed communications frequency band or the unlicensed communications frequency band. After determining this, the vehicle telematics unit 30 can decide whether or not it should continue to communicate with the cell tower 70 or stop the cellular attachment process and repeatedly restart the attachment process until the cell tower 70 provides the communications frequency band that is wanted. In one example, the vehicle telematics unit 30 can place a call to the call center 20 seeking emergency assistance. If the vehicle telematics unit 30 determines that the cell tower 70 is communicating using an unlicensed communications frequency band, the vehicle telematics unit 30 can stop the attachment process or if already attached to the cell tower 70, attempt to reattach such that the cell tower 70 will begin using the licensed communications frequency band.

Other scenarios are possible in which the vehicle telematics unit 30 is attached to the cell tower 70 and wants to stream video from the Internet. If the vehicle telematics unit 30 determines that the cell tower 70 is using a licensed communications frequency band, it can attempt to reattach to the cell tower 70 so that the unit 30 can communicate using an unlicensed communications frequency band. This may be helpful so that wireless communications for Internet-based data is transmitted at a lower cost than would occur when using a licensed communications frequency band.

The vehicle telematics unit 30 can decide whether a licensed communications frequency band or an unlicensed communications frequency band is preferred based on the node the vehicle telematics unit 30 contacts. For example, the vehicle telematics unit 30 can store a plurality of nodes in its memory and contacting one can carry with it the presumption that a particular frequency band is preferred. A PSAP or the call center 20 can each be a node that prefers a licensed communications frequency band while an Internet portal, such as a video streaming service, can be a node that prefers an unlicensed communications frequency band. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of managing licensed and unlicensed communications over a cellular protocol, comprising the steps of:
 (a) wirelessly transmitting a communication session request from a wireless device to a wireless carrier system using the cellular protocol, wherein the communication session request is transmitted over a licensed communications frequency band as a part of an attach procedure;
 (b) receiving a response at the wireless device from the wireless carrier system as a part of the attach procedure, wherein an inspection of information in the response provides an indication that either the wireless carrier system is providing a communication session using the licensed communications frequency band or the wireless carrier system is providing a communication session using an unlicensed communications frequency band;
 (c) determining whether to establish communications via the licensed communications frequency band or the unlicensed communications frequency band based on the content of the communications that are to be carried out with the wireless carrier system; and
 (d) establishing communications from the wireless device via the wireless carrier system based on whether the wireless carrier system is providing cellular communications via the licensed communications frequency band or the unlicensed communications frequency band, wherein the establishing step includes:
  when it is determined to establish communications via the licensed communications frequency band and when it is determined that the wireless carrier system is providing cellular communications via the unlicensed communications frequency band, then repeating the attach procedure including steps (a) and (b) until the wireless carrier system provides cellular communications via the licensed communications frequency band.

2. The method of claim 1, wherein the wireless device further comprises a vehicle telematics unit.

3. The method of claim 1, wherein the cellular protocol further comprises 4G LTE.

4. The method of claim 1, wherein steps (a), (b), and (d) further comprise wireless communications between the wireless device and a cell tower.

5. The method of claim 1, wherein the unlicensed communications frequency band further comprises the frequencies identified by a specification set forth in IEEE 802.11.

6. The method of claim 1, further comprising the step of storing the indication of a licensed communications frequency band in usage records at the wireless carrier system.

7. A method of managing licensed and unlicensed communications over cellular protocol, wherein the method is carried out by a wireless device, comprising the steps of:
 (a) wirelessly transmitting a communication session request from the wireless device to a wireless carrier system using the cellular protocol;
 (b) receiving a response at the wireless device from the wireless carrier system indicating that the wireless carrier system is providing a communication session using a licensed communications frequency band or an unlicensed communications frequency band;
 (c) determining from the response whether the wireless carrier system is providing cellular communications via the licensed bandwidth or the unlicensed bandwidth;
 (d) identifying a node from a plurality of nodes that is to be contacted by the wireless device via the communication session;
 (e) determining whether to use the licensed communications frequency band or the unlicensed communications frequency band based on the identified node, wherein the wireless device stores the plurality of nodes in memory of the wireless device along with a preference for the licensed communications frequency band or the unlicensed communications frequency band, and wherein the determination of step (e) is made based on inspecting the preference of the identified node as stored in memory of the wireless device;
 (f) determining whether the communication session uses a frequency band that corresponds to the frequency band as indicated by the preference of the identified node; and
 (g) when it is determined that the communication session uses a frequency band that corresponds to the determined frequency band of step (e), establishing communications via the wireless carrier.

8. The method of claim 7, wherein the wireless device further comprises a vehicle telematics unit.

9. The method of claim 7, wherein the cellular protocol further comprises 4G LTE.

10. The method of claim 7, wherein steps (a)-(d) further comprise wireless communications between the wireless device and a cell tower.

11. The method of claim 7, wherein the unlicensed communications frequency band further comprises the frequencies identified by a specification set forth in IEEE 802.11.

12. The method of claim 7, further comprising the step of determining whether to establish communications via the licensed communications frequency band or the unlicensed communications frequency band based on the content of the communications.

13. The method of claim 7, further comprising the step of storing an indication of a licensed communications frequency band in usage records at the wireless carrier system.

\* \* \* \* \*